(12) United States Patent
Nagata et al.

(10) Patent No.: US 9,265,052 B2
(45) Date of Patent: Feb. 16, 2016

(54) RADIO BASE STATION APPARATUS, USER TERMINAL AND RADIO COMMUNICATION METHOD

(75) Inventors: Satoshi Nagata, Tokyo (JP); Tetsushi Abe, Tokyo (JP); Nobuhiko Miki, Tokyo (JP); Yuuya Saitou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 183 days.

(21) Appl. No.: 13/977,933

(22) PCT Filed: Jan. 5, 2012

(86) PCT No.: PCT/JP2012/050086
§ 371 (c)(1),
(2), (4) Date: Sep. 3, 2013

(87) PCT Pub. No.: WO2012/093687
PCT Pub. Date: Jul. 12, 2012

(65) Prior Publication Data
US 2013/0336270 A1    Dec. 19, 2013

(30) Foreign Application Priority Data
Jan. 7, 2011    (JP) .................................. 2011-002443

(51) Int. Cl.
| | | |
|---|---|---|
| *H04W 4/00* | (2009.01) | |
| *H04W 72/08* | (2009.01) | |
| *H04W 16/28* | (2009.01) | |
| *H04W 72/04* | (2009.01) | |
| *H04W 16/32* | (2009.01) | |
| *H04W 84/04* | (2009.01) | |

(52) U.S. Cl.
CPC ............ *H04W 72/082* (2013.01); *H04W 16/28* (2013.01); *H04W 16/32* (2013.01); *H04W 72/046* (2013.01); *H04W 84/045* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 8,467,397 B2* | 6/2013 | Lysejko et al. | ............. | 370/395.4 |
| 2011/0281600 A1 | 11/2011 | Tanaka | | |

FOREIGN PATENT DOCUMENTS

JP     2010-171734 A     8/2010

OTHER PUBLICATIONS

International Search Report issued in PCT/JP2012/050086 mailed Apr. 3, 2012 (1 pages).
NTT DOCOMO; "Performance Evaluations of Heterogeneous Networks"; 3GPP TSG RAN WG1 Meeting #60, R1-101226; San Francisco, USA; Feb. 22-26, 2010 (18 pages).

(Continued)

*Primary Examiner* — Frank Duong
(74) *Attorney, Agent, or Firm* — Osha Liang LLP

(57) ABSTRACT

To effectively improve the reception quality in a pico-base station, while preventing throughput of a macro-base station from significantly deteriorating, a macro-base station (M-BS) is provided with a beam generating section (35) that generates a directional beam to a macro-UE using antenna weights based on a beampattern assigned to the macro-UE existing in a macro-cell having a first coverage area, and a coordination section (36) that determines a beam pattern so that a beam pattern to the macro-UE existing in the macro-cell is a beam pattern that suppresses interference power to a pico-UE existing in a pico-cell, in assigning the beam pattern to the macro-UE existing in the macro-cell during a transmission period assigned to a pico-base station (P-BS) locally forming the pico-cell in the macro-cell.

8 Claims, 9 Drawing Sheets

(56) References Cited

OTHER PUBLICATIONS

3GPP TS 36.300 V11.0.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2011 (194 pages).

Office Action issued in corresponding Japanese Application No. JP2011-002443 mailed on Oct. 29, 2013 (6 pages).

Motorola; "On Range Extension in Open-access Heterogeneous Networks"; 3GPP TSG RAN1#61, R1-103181; Montreal, Canada; May 10-14, 2010 (9 pages).

\* cited by examiner

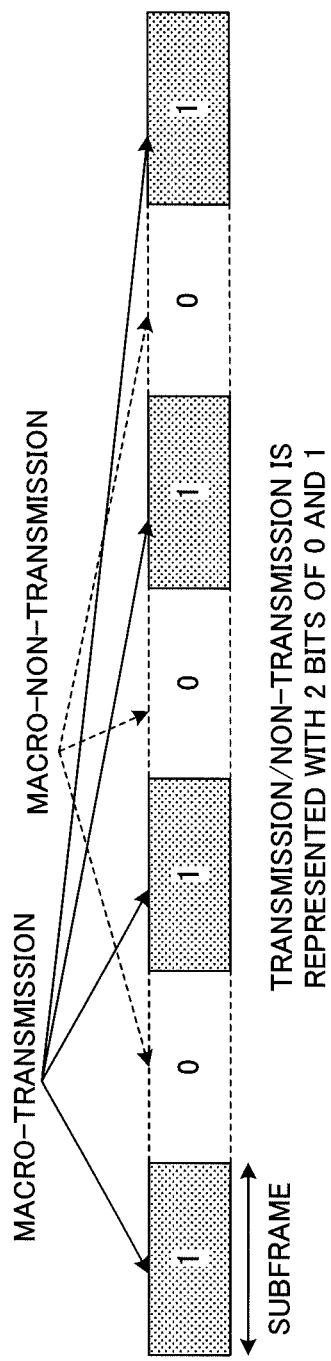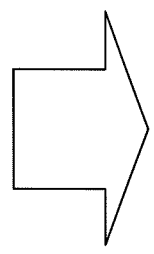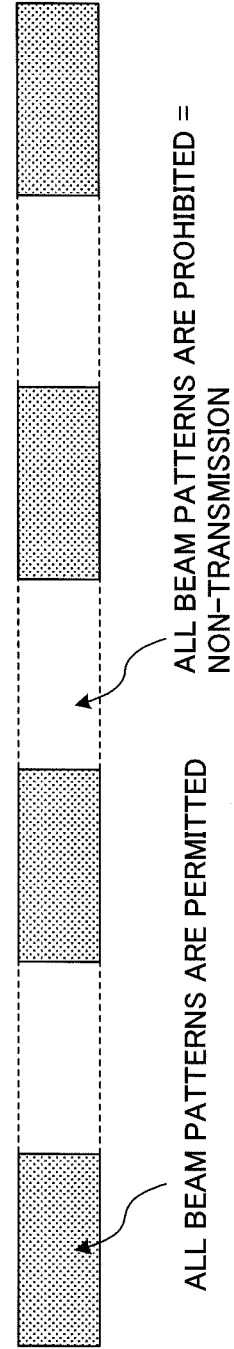
FIG. 5A
FIG. 5B

| CODEBOOK INDEX | $u_n$ | NUMBER OF LAYERS U | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |
| 16 | | 0 | 0 | 0 | 0 |
| 17 | | | | | |

Codebook indices 0–15: ALREADY DEFINED BEAM PATTERNS
16: ADD NON-TRANSMISSION
17: ADD PERMISSION FOR ALL

FIG. 6

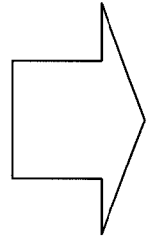

RADIO BASE STATION APPARATUS, USER TERMINAL AND RADIO COMMUNICATION METHOD

TECHNICAL FIELD

The present invention relates to a radio base station apparatus, user terminal and radio communication method in a radio communication system in which a micro-cell is overlapped and disposed in a macro-cell.

BACKGROUND ART

Currently, the 3GPP (Third Generation Partnership Project) has proceeded with the standardization of LTE-advanced (hereinafter, specifications of LTE Release 10 and subsequent specifications are collectively called "LTE-A") that is an evolved radio interface of LTE (Long Term Evolution) Release 8 specifications (hereinafter, referred to as LTE or Rel. 8). LTE-A is aimed at actualizing higher system performance than LTE while keeping backward compatibility with LTE.

In LTE-A, HetNet (Heterogeneous Network) has been studied in which a micro-cell (for example, pica-cell femto-cell, etc.) having a local coverage area with a radius of about several tens of meters is formed in a macro-cell having a wide-range coverage area with a radius of about several kilometers (for example, Non-patent Document 1). In the following description, a radio base station forming the macro-cell is called a macro-base station, and a radio base station forming the micro-cell is called a micro-base station (pico-base station or femto-base station).

A pico-base station that is one of micro-base stations has low transmission power (of about several tens of milliwatts to several watts) and a small cell radius as compared with the macro-base station, but is capable of using radio resources of a bandwidth equal to the macro-base station. Therefore, in order to efficiently accommodate locally concentrated high-density traffic such as a hot spot, offload is studied that the pico-base station accommodates apart of traffic of the macro-base station.

Further, studied is Cell Range Expansion (CRE) that is a technique for providing reception quality (reception power) in cell selection with bias, and thereby increasing the cell radius of the pico-base station. A user terminal existing in the pico-cell expanded by CRE is capable of performing handover (offload) from under the macro-base station to under the pico-base station, and it is thereby possible to increase the offload effect.

PRIOR ART DOCUMENT

Non-patent Document

[Non-patent Document 1] 3GPP, TS36.300

DISCLOSURE OF INVENTION

Problems to be Solved by the Invention

However, in the case where a user terminal is offloaded from under the macro-base station to under the pico-base station, the user terminal offloaded to under the pico-base station is near the macro-base station, and therefore, there is a problem that the user terminal undergoes large interference from the macro-base station.

The present invention was made in view of such a respect, and it is an object of the invention to provide a radio base station apparatus, user terminal and radio communication method for enabling the reception quality in a pico-base station to be effectively improved while enabling throughput of a macro-base station to be prevented from significantly deteriorating.

Means for Solving the Problem

A radio base station apparatus of the invention is characterized by having a beam generating section that generates a directional beam to a user terminal using antenna weights based on a beam pattern assigned to the user terminal existing in a first cell having a first coverage area, and a coordination section that determines a beam pattern so that a beam pattern to the user terminal existing in the first cell is a beam pattern that suppresses interference power to a user terminal existing in a second cell, in assigning the beam pattern to the user terminal existing in the first cell during a transmission period assigned to a micro-base station locally forming the second cell having a second coverage area smaller than the first coverage area in the first cell.

The coordination section provided in the above-mentioned radio base station apparatus is characterized by receiving a second cell beam pattern suitable for the user terminal existing in the second cell that the micro-base station accommodates from the micro-base station, and determining the beam pattern that suppresses interference power to the user terminal existing in the second cell by referring to the second cell beam pattern during the transmission period assigned to the micro-base station forming the second cell.

Further, the coordination section provided in the above-mentioned radio base station apparatus is characterized by having a table having a plurality of indexes respectively associated with a plurality of beforehand determined kinds of beam patterns, an index indicating that all beam patterns are permitted, and an index indicating that all beam patterns are prohibited, specifying an index of a beam pattern determined on a subframe-by-subframe basis, where the subframe corresponds to a transmission time interval, according to the table, and signaling the specified index to the micro-base station.

Advantageous Effect of the Invention

According to the invention, it is possible to effectively improve the reception quality in the pico-base station, and to prevent throughput of the macro-base station from significantly deteriorating.

BRIEF DESCRIPTION OF DRAWINGS

FIG. 5 contains conceptual diagrams of antenna weight control and backhaul signaling;

FIG. 6 is a codebook configuration diagram used in backhaul signaling;

FIG. 7 contains diagrams illustrating subframe patterns to notify of a beam pattern;

BEST MODE FOR CARRYING OUT THE INVENTION

In a radio communication system in which a second cell having a second coverage area smaller than a first coverage area is locally formed in a first cell having the first coverage area, from the viewpoint of reducing interference from the macro-base station to the pico-cell, it is effective to apply an interference coordination technique (resource division) in which the macro-base station and the pico-base station use different radio resources.

Figure 1:
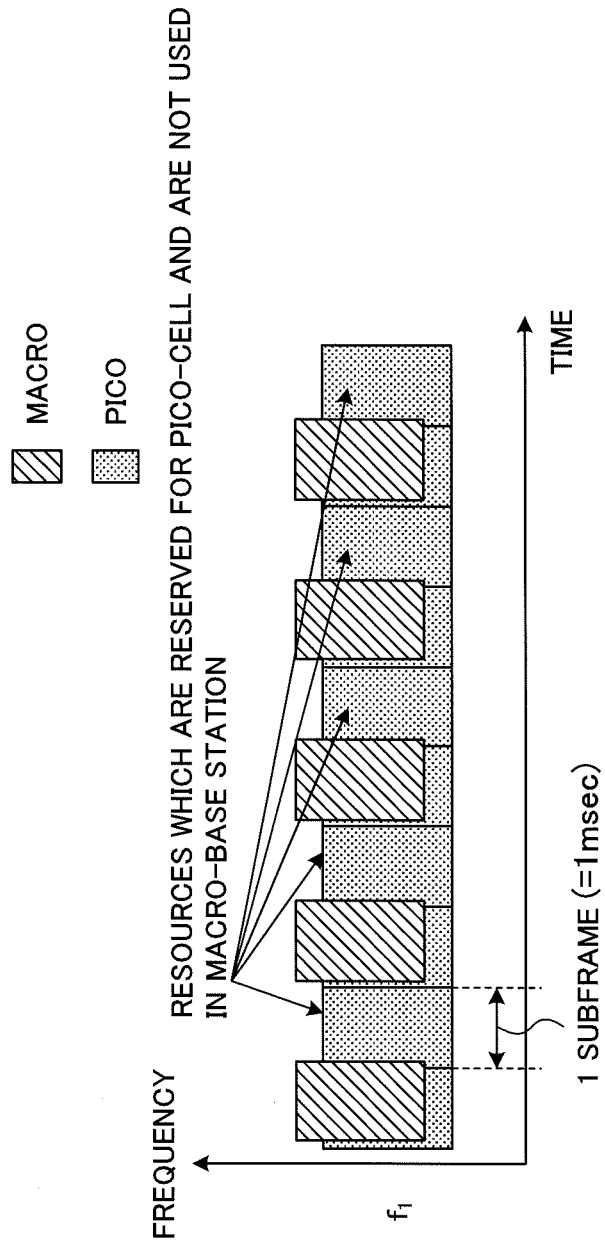
FIG. 1 is a diagram illustrating interference coordination by resource division in the time domain.

FIG. 1 is a diagram illustrating interference coordination by resource division in the time domain.

The transmission time intervals (subframes) of the macro-base station and pico-base station are synchronized, the macro-base station halts radio transmission in subframes without radio resources being assigned, and the pico-base station performs radio communications with a user terminal (hereinafter, referred to as a pico-UE) under the pico-base station mainly in the subframes without radio resources being assigned to the macro-base station. By this means, in the radio communication system in which a micro-cell having low transmission power and a local coverage area is overlapped and disposed in the macro-cell having high transmission power and a wide-range coverage area, the macro-base station halts data transmission in a part of subframes, and it is thereby possible to reduce interference to the pico-UE from the macro-base station. However, in the above-mentioned interference coordination, although it is possible to effectively improve the reception quality in the pico-base station, since radio resources decrease, throughput of the macro-base station significantly deteriorates.

It is the gist of the invention to determine a beam pattern of the macro-base station so that the macro-base station communicates with a user terminal (hereinafter, referred to as a macro-UE) under the macro-base station using a beam pattern that decreases interference power to the pico-UE (beam pattern with null directed toward the pico-UE) in radio resources in which the macro-base station has not performed transmission to reduce interference to the pico-base station.

According to the invention, the macro-base station communicates with the macro-UE using a beam pattern that decreases interference power to the pico-UE in radio resources (time domain/frequency domain) in which macro-transmission has conventionally not been performed, and therefore, it is possible to effectively improve the reception quality in the pico-base station, and to improve throughput of the macro-base station.

Figure 2:
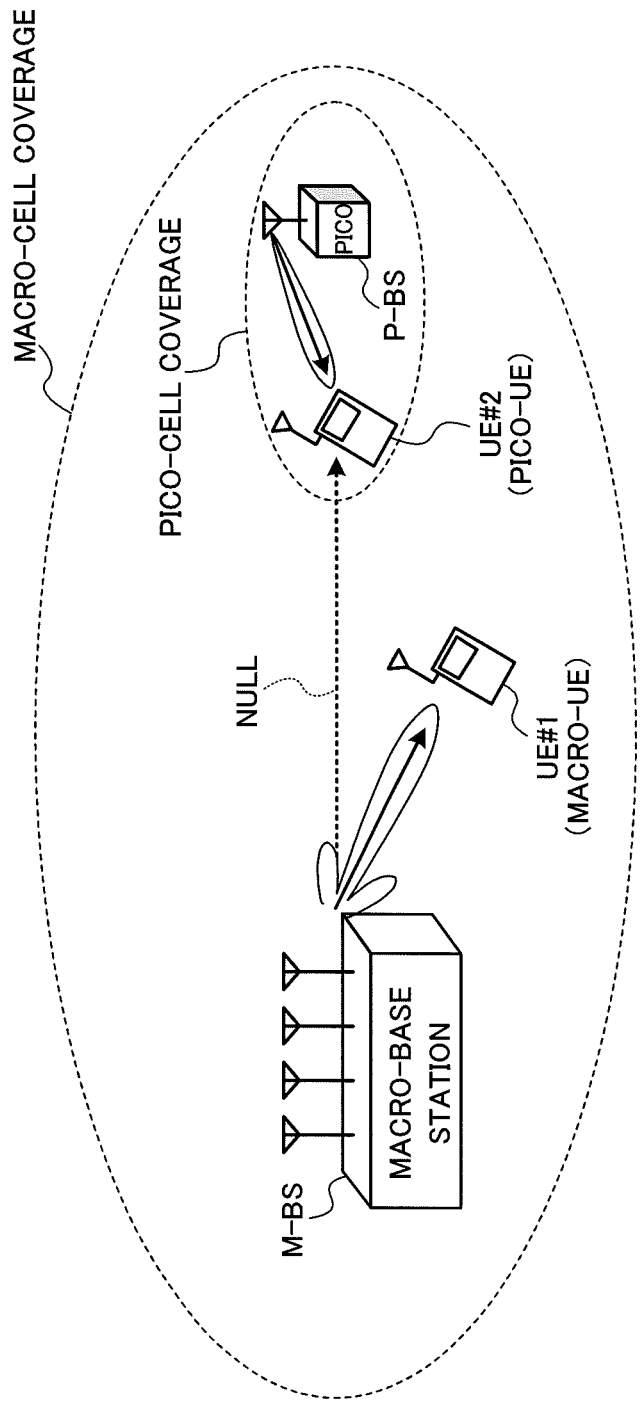
FIG. 2 is a diagram illustrating a state in which a macro-base station communicates with a macro-UE by a beam pattern with null directed toward a pico-UE.

As shown in FIG. 2, the macro-base station M-BS controls an antenna weight of each antenna, and is thereby capable of forming a beam pattern such that a directional beam is directed toward a UE#1 that is the macro-UE under the macro-base station M-BS, and null (region with low leakage power) is directed toward a UE#2 that is the pico-UE under the pico-base station P-BS. The beam pattern is to direct null toward the pico-UE, and therefore, has the effect of reducing interference to the pico-UE.

An Embodiment of the present invention will specifically be described below with reference to accompanying drawings.

Figure 3:
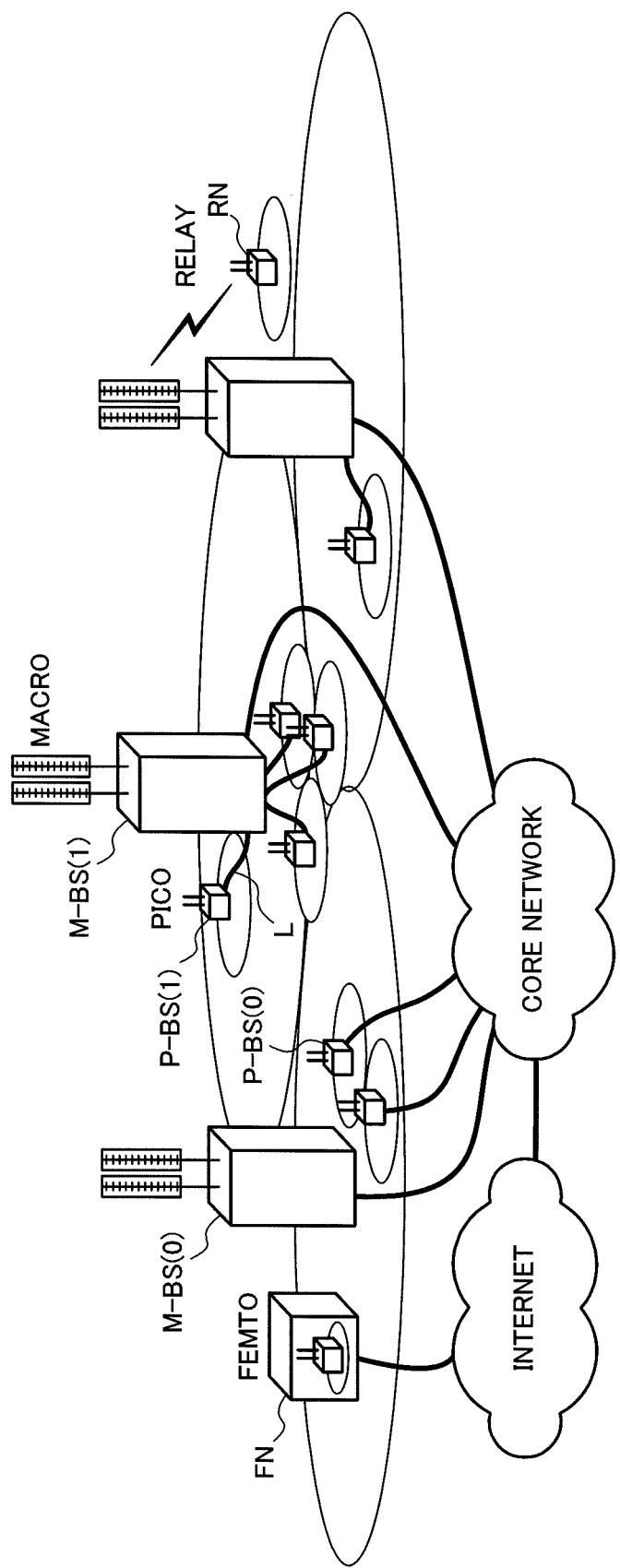
FIG. 3 is a schematic configuration diagram of HetNet.

FIG. 3 is a schematic configuration diagram of HetNet. As shown in FIG. 3, HetNet has a possibility that new nodes (femto-base station FN, pico-base station P-BS, and relay base station RN) coexist in addition to the macro-base station M-BS. This Embodiment mainly describes an interference control configuration between the macro-base station M-BS and the pico-base station P-BS.

The macro-base station M-BS and the pico-base station P-BS are connected via a backhaul link. The backhaul is a transmission path to connect between base stations. In the invention, the form of the backhaul link is not limited. For example, the backhaul is capable of being configured using a wired backhaul link "L" as between the macro-base station M-BS (1) and the pico-base station P-BS (1), or may be configured including a core network as a part of the transmission path as between the macro-base station M-BS (0) and the pico-base station P-BS (0). Herein, interference coordination between the macro-base station M-BS (1) and the pico-base station P-BS (1) is mainly described, and the same interference coordination is applicable to between another macro-base station and another pico-base station (for example, between the macro-base station M-BS (0) and the pico-base station P-BS (0)).

Figure 4:
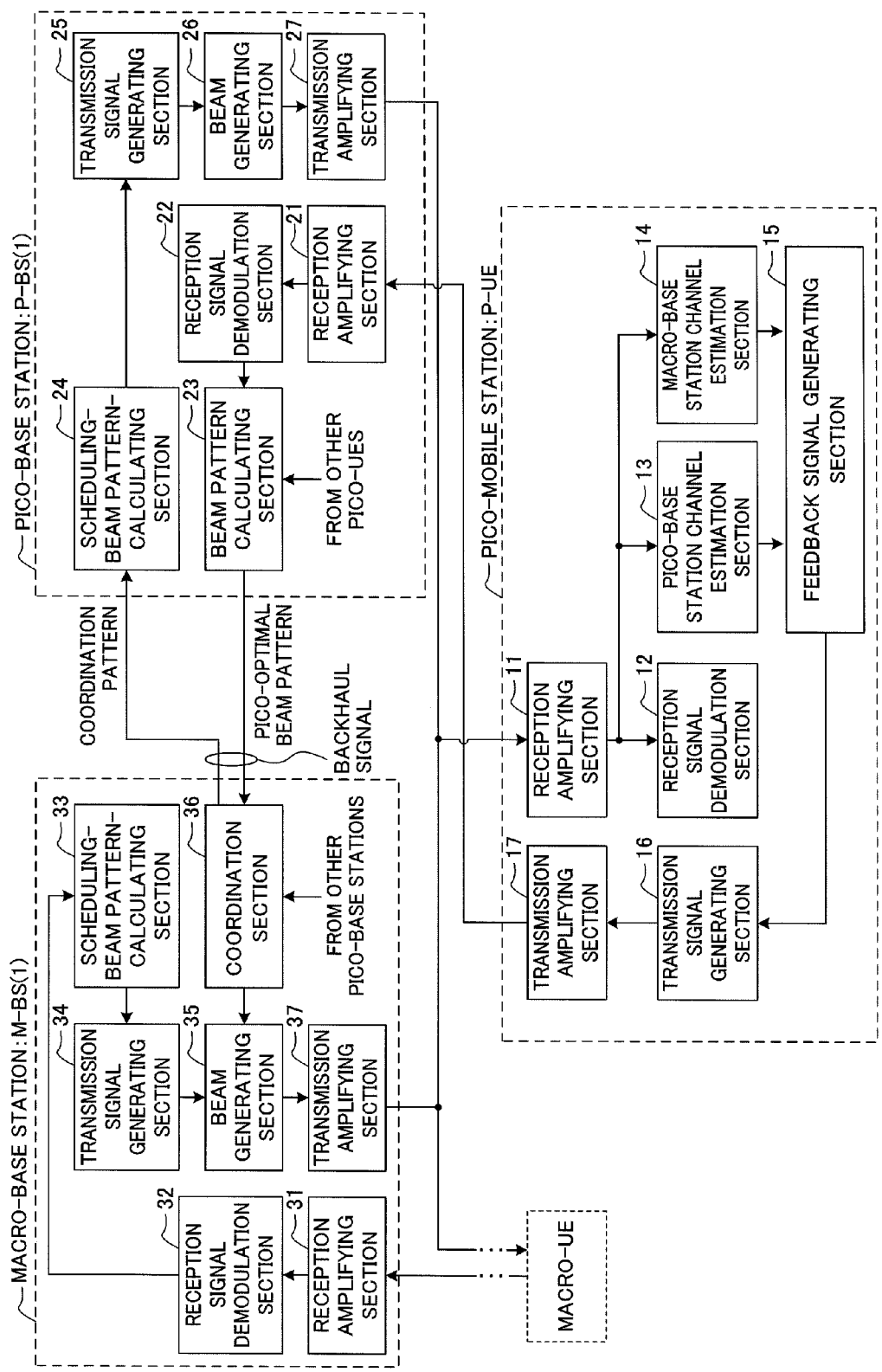
FIG. 4 is a functional block diagram of the macro-base station, pico-base station and pico-mobile station.

FIG. 4 is a functional block diagram of the macro-base station M-BS (1), pico-base station P-BS (1) and pico-mobile station P-UE. The pico-mobile station P-UE is a pico-UE connected to the pico-base station P-BS (1), and exists inside a coverage area of the macro-base station M-BS (1). For example, in FIG. 2, the pico-mobile station P-UE is the UE#2 connected to the pico-base station P-BS.

The pico-mobile station P-UE receives each of a downlink reference signal transmitted from the pico-base station P-BS (1) and a downlink reference signal transmitted from the macro-base station M-BS (1). The pico-mobile station P-UE performs channel estimation of a radio channel with the pico-base station P-BS (1) and channel estimation of a radio channel with the macro-base station M-BS (1). Based on the channel estimation results with the macro-base station M-BS (1) and the pico-base station P-BS (1), the pico-mobile station P-UE generates a feedback signal to transmit to the pico-base station P-BS (1) as feedback.

The pico-mobile station P-UE is provided with a reception amplifying section 11 that receives a radio signal. The pico-mobile station P-UE exists inside coverage areas of both the macro-base station M-BS (1) and the pico-base station P-BS (1). Therefore, the reception amplifying section 11 receives each of a signal transmitted from the pico-base station P-BS (1), and a signal transmitted from the macro-base station M-BS (1). The reception amplifying section 11 performs frequency conversion on the received radio signal to obtain a baseband reception signal. The signals transmitted from the pico-base station P-BS (1) and the macro-base station M-BS (1) include downlink reference signals, downlink control channel signals, and downlink common channel signals. The pico-mobile station P-UE captures all signals transmitted from the pico-base station P-BS (1) and performs processing as described later. Meanwhile, the pico-mobile station P-UE is not connected to the macro-base station M-BS (1), and therefore, for the signals transmitted from macro-base station M-BS (1), is capable of capturing only the downlink reference signal for channel estimation for interference coordination.

For example, the downlink reference signal includes a cell-specific reference signal, user-specific reference signal and channel information (CSI: Channel State Information) measurement reference signal (CSI-RS) specified in LTE/LTE-A. The cell-specific reference signal is transmitted from each antenna provided in the pico-base station P-BS (1), and is used in the pico-mobile station P-MS for various purposes such as channel estimation, symbol synchronization, CQI measurement, and Mobility measurement. The user-specific reference signal specified in LTE is a reference signal for channel estimation defined to support adaptive beamforming. Beamforming is the technique for controlling the amplitude and phase of a plurality of antennas, thereby forming a directional pattern (hereinafter, referred to as a beam pattern) in the antennas, and increasing/decreasing antenna gain in the particular direction. Further, in the user-specific reference signal specified in LTE-A, in addition to adaptive beamforming, two-dimensional, time and frequency, orthogonal CDM (Code Division Multiplexing) is applied to multiplexing among transmission layers. The CSI-RS specified in LTE-A is a cell/antenna-specific reference signal (that supports maximum 8-layer transmission per cell). The CSI-RS is transmitted in a relatively long cycle (cycle such as once in a plurality of subframes) as compared with the cell-specific reference signal. This is because it is possible to set the reference signal density required for CQI estimation to be low, as compared with the reference signal density required for channel estimation used in data demodulation. The signal transmitted from the macro-base station M-BS (1) also includes the same types of downlink reference signals as the downlink reference signals transmitted from the pico-base station P-BS (1).

The downlink control channel is a control signal to notify of information required for shared channels (PDSCH reception, PUSCH transmission), and includes PDCCH (Physical Downlink Control Channel), PCFICH (Physical Control Format Indicator Channel), and PHICH (Physical Hybrid ARQ Indicator Channel). To reduce a delay, the downlink control channel is multiplexed into first to third OFDM symbols at the beginning of a subframe. The PDCCH is a control signal to notify of assignment information of PDSCH and PUSCH. The PCFICH is a control signal to notify of a CFI (Control channel Format Indicator) value that is the number of downlink control channel symbols to actualize transmission with high efficiency. The PHICH is a control signal to notify of ACK/NACK information for uplink (PUSCH). In a communication system using shared channels, it is necessary to signal which mobile station is assigned the above-mentioned shared channel for each subframe, and a control channel used in the aforementioned signaling is called the PDCCH in LTE/LTE-A. The subframe may be called the transmission time interval (TTI). The information of the above-mentioned PDCCH includes PCFICH, Downlink Scheduling Information, ACK/NACK, UL Scheduling Grant, Overload Indicator, and Transmission Power Control Command Bit. Further, for example, the above-mentioned Downlink Scheduling Information includes assignment information of downlink Resource Block, ID of the user terminal, the number of streams, information on Precoding Vector, data size, modulation scheme and information on HARQ. Furthermore, for example, the above-mentioned Uplink Scheduling Grant includes assignment information of uplink Resource Block, ID of the user terminal, data size, modulation scheme, uplink transmission power information and information of the uplink reference signal.

The reception signal output from the reception amplifying section 11 is supplied to a reception signal demodulation section 12, pico-base station channel estimation section 13 and macro-base station channel estimation section 14.

The pico-base station channel estimation section 13 estimates a channel state with the pico-base station P-BS (1) from the downlink reference signal (downlink reference signal transmitted from the pico-base station P-BS (1)) given from the reception amplifying section 11. The pico-base station channel estimation section 13 obtains a channel estimation result by estimating an attenuation amount, phase rotation amount and delay amount that the cell-specific reference signal undergoes on the radio channel (path from each antenna of the pico-base station P-BS (1) to the antenna of the pico-mobile station P-UE). The channel estimation result using the cell-specific reference signal is used in demodulation processing in the pico-mobile station P-MS (1). Further, the pico-base station channel estimation section 13 performs channel estimation for adaptive beamforming using the user-specific reference signal.

The macro-base station channel estimation section 14 estimates a channel state with the macro-base station M-BS (1) using the downlink reference signal transmitted from the macro-base station M-BS (1). The macro-base station channel estimation section 14 obtains a channel estimation result by estimating an attenuation amount, phase rotation amount and delay amount that the cell-specific reference signal undergoes on the radio channel (path from each antenna of the macro-base station M-BS (1) to the antenna of the pico-mobile station P-UE). Further, when the macro-base station M-BS (1) transmits a user-specific reference signal, the macro-base station channel estimation section 14 may perform channel estimation for adaptive beamforming using the user-specific reference signal. The obtained estimation value (channel estimation) is given to the reception signal demodulation section 12 and feedback signal generating section 15.

The reception signal demodulation section 12 demodulates the downlink control channel signal and PDSCH, using the channel estimation result obtained in the pico-base station channel estimation section 13. The reception signal demodulation section 12 demodulates the PDSCH based on the downlink control channel signal. In addition, since the precoding weight information used in transmission of the PDSCH is notified from the pico-base station P-BS (1) to the pico-mobile station P-MS (1) via the PDCCH, the pico-mobile station P-MS (1) demodulates the PDSCH using the notified precoding weight information. The demodulated user data is delivered to the higher layer.

The feedback signal generating section 15 generates a feedback signal to be feedback to the pico-base station P-BS (1). In LTE, in downlink closed-loop SU-MIMO transmission using feedback on the channel information from a user terminal, in order to improve the reception SINR (Signal to Interference plus Noise power Ratio), precoding is used in which a downlink shared channel (PDSCH) is multiplied by a transmission antenna weight varying with each transmission layer and is transmitted. In LTE, by the model that maximizes combined throughput of layers subjected to precoding, candidates for beforehand determined precoding weight matrixes are defined in a codebook, and the user terminal selects an optimal weight matrix from the codebook, and transmits an index (PMI: Precoding Matrix Indicator) to the base station as feedback. Further, in LTE, applied is rank adaptation to adaptively control the number of transmission layers (rank) corresponding to the channel state such as the reception SINR in the user terminal and fading correlation between antennas. In addition to the channel quality information (CQI: Channel Quality Indicator) to the base station apparatus, the user terminal transmits optimal rank information (RI: Rank Indicator) to the base station as feedback. As the reception quality information, the user terminal generates optimal quality information for the pico-base station, and quality information of the poorest quality (i.e. lowest interference in the case of being used in the macro-base station) for the macro-base station. Further, quality information different from LTE may be defined. For example, it is considered returning the channel matrixes from the pico-base station and macro-base station.

The feedback signal generating section 15 generates the CQI corresponding to the channel estimation result obtained in the pico-base station channel estimation section 13 as one of feedback signals. Further, the feedback signal generating section 15 selects an optimal weight matrix from the codebook according to the cell-specific reference signal received from the pico-base station P-BS (1), and obtains an index (PMI) of the selected weight matrix as one of feedback signals. Furthermore, the feedback signal generating section 15 determines optimal rank information corresponding to the channel state such as the reception SINR and fading correlation between antennas, and obtains the determined rank information (RI) as one of feedback signals. Thus, the feedback signal generating section 15 generates the PMI, RI and CQI determined corresponding to the radio channel state with pico-base station P-BS (1) as a first feedback signal.

Herein, the channel estimation result obtained in the macro-base station channel estimation section 14 indicates what interference transmission power of the macro-base station M-BS (1) provides to the pico-mobile station P-UE. The feedback signal generating section 15 generates the CQI corresponding to the channel estimation result obtained in the macro-base station channel estimation section 14 as a second feedback signal.

A transmission signal generating section 16 multiplexes the first and second feedback signals, uplink reference signal, uplink control signal and uplink user data to generate a transmission signal to transmit in uplink. A transmission amplifying section 17 transmits the generated transmission signal as a radio signal. In uplink, used are the Physical Uplink Shared Channel (PUSCH) that is shared among user terminals in a pico-cell and Physical Uplink Control Channel (PUCCH). In uplink, on the uplink control channel is transmitted downlink channel information (first and second feedback signals) used in scheduling of the physical shared channel and adaptive modulation/demodulation and coding (AMC: Adaptive Modulation and Coding) in downlink, and transmission acknowledgment information (HARQ ACK information) of the Physical Downlink Shared Channel. Further, the user data is transmitted on the physical Uplink Shared Channel.

The pico-base station P-BS (1) communicates with the macro-base station M-BS (1) via the backhaul link L. The pico-base station P-BS (1) determines an optimal beam pattern (pico-optimal beam pattern) in the pico-cell based on the first and second feedback signals, and notifies the macro-base station M-BS (1) of the determined pico-optimal beam pattern with the backhaul link L. The pico-base station P-BS (1) determines an optimal beam pattern to each pico-mobile station, according to a beam pattern (coordination beam pattern) of the macro-base station M-BS (1) notified from the macro-base station M-BS (1) via the backhaul link L.

The pico-base station P-BS is provided with a reception amplifying section 21 that receives an uplink signal transmitted from the pico-mobile station P-UE under the pico-base station P-BS. The reception amplifying section 21 converts the received uplink signal into a baseband reception signal. The reception signal received in the reception amplifying section 21 includes an uplink reference signal, uplink control signal and user data transmitted from the pico-mobile station P-UE. Particularly, the reception signal received in the reception amplifying section 21 includes the first feedback signal determined in the pico-mobile station P-UE so that the reception quality of the radio channel with the pico-base station P-BS is optimal, and the second feedback signal indicative of the channel state with the macro-base station M-BS (1).

A reception signal demodulation section 22 demodulates the uplink control signal and user data included in the reception signal, while demodulating the first feedback signal and the second feedback signal. The first and second feedback signals are given to a beam pattern calculating section 23. The beam pattern calculating section 23 determines the pico-optimal beam pattern, based on the first and second feedback signals notified from all pico-mobile stations connecting to the pico-base station P-BS (1). For example, the section 23 is capable of determining an optimal beam pattern for the pico-base station P-BS (1) to transmit to the pico-mobile station P-MS (1) from the first feedback information notified from the pico-mobile station P-MS (1). Further, the section 23 is capable of determining a beam pattern candidate of the macro-base station M-BS (1) that minimizes interference to the pico-mobile station P-MS (1) from the second feedback information notified from the pico-mobile station P-MS (1). Similarly, for each of the other pico-mobile stations, the section 23 determines each optimal beam pattern candidate of the pico-base station P-BS (1) from the first feedback information, and each optimal beam pattern candidate of the macro-base station M-BS (1) that minimizes interference to the pico-mobile station P-MS (1) from the second feedback information. The beam pattern calculating section 23 determines one or a plurality of beam patterns of the pico-base station P-BS (1) that is the best for all the pico-mobile stations from beam pattern candidates. The beam pattern calculating section 23 may determine one or a plurality of beam patterns of the macro-base station M-BS (1) that is the best for all the pico-mobile stations. Thus determined pico-optimal beam pattern is notified to the macro-base station M-BS (1) via the backhaul link. Described herein is the method based on feedback from the pico-UE, and it is also possible to apply the method for determining a coordination pattern by the macro-base station receiving uplink reception signals from pico-UEs.

Further, in the pico-base station P-BS (1), a scheduling-beam pattern-calculating section 24 determines the beam pattern and transmission subframe to each pico-mobile station. The scheduling-beam pattern-calculating section 24 is notified of the coordination pattern from the macro-base stationM-BS (1) via the backhaul link L. Details of the backhaul signaling of the coordination pattern will be described together with the macro-base station. Corresponding to the coordination pattern notified from the macro-base station M-BS (1), the scheduling-beam pattern-calculating section 24 determines the beam pattern subjected to interference coordination for each pico-mobile station. The beam pattern and transmission period (subframe unit) determined by the scheduling-beam pattern-calculating section 24 for the pico-mobile station P-MS (1) are indicated to a transmission signal generating section 25.

The transmission signal generating section 25 generates a downlink signal to the pico-mobile station P-MS (1), and a beam generating section 26 forms a beam according to antenna weights to form the beam pattern indicated from the scheduling-beam pattern-calculating section 24. A transmission amplifying section 27 synchronizes the beam pattern formed by the beam generating section 26 with a transmission subframe to perform radio transmission. For the other pico-mobile stations, similarly, radio transmission is performed using the beam pattern with transmission power directed toward each pico-mobile station according to the beam pattern and transmission period (subframe) determined by the scheduling-beam pattern-calculating section 24.

The macro-base station M-BS (1) receives a signal (uplink reference signal, PUCCH and PUSCH) transmitted in uplink from the user terminal (macro-UE) connecting to the macro-base station M-BS (1) in a reception amplifier 31, and demodulates the signal in a reception signal demodulation section 32. As the pico-mobile station P-MS (1), the macro-UE notifies the macro-base station M-BS (1) of the channel information and the like obtained in the channel estimation in the macro-UE with the feedback signals (CQI, PMI and RI). The feedback signals (CQI, PMI and RI) among uplink signals demodulated in the reception signal demodulation section 32 are given to a scheduling-beam pattern-calculating section 33. Herein, it is also possible to notify of a different pattern.

The scheduling-beam pattern-calculating section 33 determines a beam pattern assigned to the macro-UE, based on the feedback signals (CQI, PMI and RI) transmitted from the macro-UE as feedback. In addition, the beam pattern determined by the scheduling-beampattern-calculating section 33 is applied to the transmission period assigned only to the macro-base station M-BS, and is not applied to the transmission period assigned to the pico-base station P-BS. The beam pattern determined by a coordination section 36 is applied to the transmission period assigned to the pico-base station P-BS. A transmission signal generating section 34 generates a downlink transmission signal to the macro-UE by synchronizing with the transmission subframe assigned to the macro-UE.

A beam generating section 35 forms the beam according to the beam pattern assigned to the macro-UE, and antenna weights are controlled from the coordination section 36 so that null is directed toward the pico-mobile station P-MS (1) in a part of transmission subframes. The directional beam beam-generated in the beam generating section 35 undergoes radio transmission from a transmission amplifier 37.

Herein, antenna weight control and backhaul signaling by the coordination section 36 will be specifically described.

In the case of switching transmission (macro-transmission) of the macro-base station M-BS and non-transmission (macro-non-transmission) of the macro-base station M-BS on a subframe-by-subframe basis, as shown in FIG. 5A, the macro-base station M-BS is capable of signaling macro-transmission/macro-non-transmission to the pico-base station P-BS with 2 bits (for example, macro-non-transmission is "0", while macro-transmission is "1".) Meanwhile, as shown in FIG. 5B, macro-transmission is capable of being interpreted as that "all beam patterns are permitted for the macro-base station M-BS", and macro-non-transmission is capable of being interpreted as that "all beam patterns are prohibited for the macro-base station M-BS".

In LTE, in the case of 4 antennas, 16 kinds of beam patterns are defined. When it is possible to notify the pico-base station P-BS of total 18 patterns of 16 kinds of beam patterns, a pattern to permit all beam patterns and a pattern to prohibit all beam patterns via the backhaul link, it is possible to greatly improve throughput of the macro-base station M-BS.

For example, a part of radio resources (transmission period to permit the macro-base station M-BS to perform transmission with a part of radio resources) are allocated to the macro-base station M-BS in the same subframe #n as the subframe "n" in which radio resources (that correspond to a transmission period to permit transmission to the pico-UE) are allocated to the pico-base station P-BS. At this point, the macro-base station M-BS is assigned a beam pattern (radio resources) that reduces interference to the pico-UE under the pico-base station P-BS. The beam pattern assigned to the macro-base station M-BS in the subframe #n is represented by a number of bits (for example, 5 bits in the case of total 18 patterns) to signal to the pico-base station P-BS. The pico-base station P-BS selects a beam pattern that provides small interference with the beam pattern of the macro-base station M-BS signaled from the macro-base station M-BS in the subframe #n that permits transmission to the pico-UE, and is capable of using in transmission to the pico-UE.

Even in the subframe #n in which the transmission period (radio resources) is assigned to the pico-base station P-BS, when the number of terminals that undergo interference from the macro-base station M-BS is low, there is a possibility that interference to the pico-cell is reduced even when the number of beam patterns capable of being assigned to the macro-base station M-BS is increased in the subframe #n. When the number of beam patterns assigned to the macro-base station M-BS is increased, it is possible to increase throughput of the macro-base station M-BS. By dynamically controlling the number of beam patterns capable of being assigned to the macro-base station M-BS corresponding to the number of pico-UEs (or the position of the pico-UE) that undergo interference from the macro-base station M-BS, it is possible to maximize throughput of the macro-base station M-BS.

FIG. 6 shows a codebook table associated with 18 kinds of beam patterns (in the case of 4 antennas). In the case of 4 antennas, the beam patterns are of 18 kinds, where 2 patterns are added to 16 kinds of beam patterns defined in LTE. One is the pattern to prohibit (non-transmission) all beam patterns in the macro-base station M-BS, and the other one is the pattern to permit all beam patterns in the macro-base station M-BS. The codebook table in FIG. 6 is a table configuration when the maximum number of streams is "4". For each stream, 18 beam patterns are defined. With respect to 16 kinds of beam patterns defined in LTE, it is possible to reuse indexes 0 to 16 already defined in LTE. Alternatively, new beam patterns may be defined.

FIGS. 7A and 7B show an example of subframe patterns for signaling a beam pattern and the number of streams using the codebook table as shown in FIG. 6. The subframe pattern as shown in FIG. 7A corresponds to the subframe pattern as shown in FIG. 5A. Subframes #0, #2, #4 and #6 assigned macro-transmission in FIG. 5A are set for a bit set of (17,4). This means that the macro-base station M-BS is permitted to use all beam patterns (index=17) and to use the maximum number of streams (the number of streams=4) in subframes #0, #2, #4 and #6. Further, subframes #1, #3, and #5 in which the transmission period (macro-non-transmission) is assigned to the pico-base station P-BS in FIG. 5A are set for a bit set of (16,1). This means that the macro-base station M-BS is prohibited from using any of all beam patterns (index=16) in subframes #1, #3, and #5.

In the subframe pattern as shown in FIG. 7B, subframes #0, #2, #4 and #6 that correspond to macro-transmission in FIG. 5A are set for a bit set of (17,4). Further, subframes #1, #3 and #5 in which the transmission period is assigned to the pico-base station P-BS are set for a bit set of (0,1). This means that only one stream is permitted in the macro-base station M-BS with a particular beam pattern (index=0) in subframes #1, #3 and #5. For example, as the particular beam pattern (index=0), selected is a beam pattern (with null directed toward the pico-mobile station P-MS (1)) such that interference power is reduced to the pico-mobile station P-MS (1) that communicates in the same subframes #1, #3 and #5 as those of the macro-base station M-BS. By this means, in subframes in which macro-transmission has conventionally not been performed, it is possible to assign a part of beam patterns (radio resources) also to the macro-base station M-BS for communications with the macro-UE with interference to the pico-cell suppressed, and it is possible to increase macro-throughput.

Figure 8:
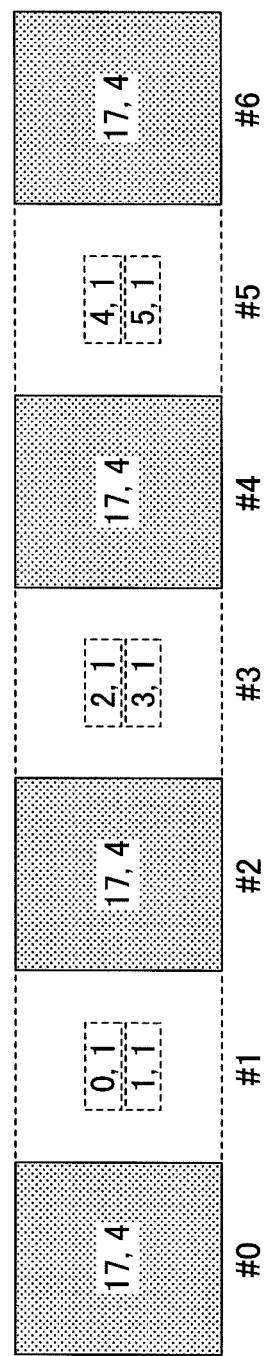
FIG. 8 is a diagram illustrating a subframe pattern to notify of a plurality of beam patterns.

FIG. 8 shows another example of the subframe pattern for signaling beam patterns using the codebook shown in FIG. 6. The subframe #1 in which the transmission period is assigned to the pico-base station P-BS is set for two bit sets of a bit set (0,1) and a bit set (1,1). In this way, it is possible to notify the macro-base station M-BS of a plurality of permitted beam patterns in one subframe. For example, in the case that the number of pico-UEs targeted for communications is low in subframes #1, #3 and #5 in which the transmission period is assigned to the pico-base station P-BS, even when a plurality of beam patterns is permitted in the macro-base station M-BS in the subframes #1, #3 and #5, a probability that it is possible to suppress interference to the pico-UEs is high, and it is possible to increase macro-throughput.

Figure 9:
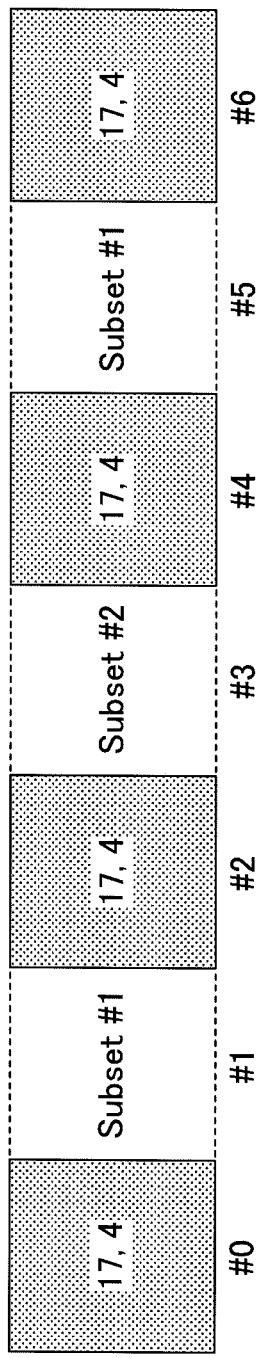
FIG. 9 is a diagram illustrating a subframe pattern to notify of beam patterns with a subset.

FIG. 9 shows an example for notifying of beam patterns permitted in the macro-base station M-BS as a subset. A subset #1 is notified in subframes #1 and #5 in which the transmission period is assigned to the pico-base station P-BS, and a subset #2 is notified in the subframe #3. In the example as shown in FIG. 9, in the case that the number of streams is "1", grouping is performed by making the index 1 and index 2 a subset #1, the index 3 and index 4 a subset #2 . . . . In the codebook configuration as shown in FIG. 6, indexes of No. 1 to No. 15 are divided into a plurality of subsets, and the subset number assigned to each subset is used in backhaul signaling. By this means, it is possible to decrease the number of bits to represent the beam pattern, and to suppress overhead of backhaul signaling.

Further, while maintaining the scheme for notifying of a beam pattern on a subframe-by-subframe basis as described above, bit sets of different beam patterns and the different numbers of streams may be assigned in a plurality of frequency domains. For example, in the subframe #1, a first bit set (beam pattern+the number of streams) is permitted in the macro-base station M-BS in some frequency resources f1, and a second bit set (beam pattern+the number of streams) is permitted in the macro-base station M-BS in other frequency resources f2. The frequency resources f1 and f2 may be different resource blocks in the subframe #1.

Further, in the subframes #1, #3 and #5 that permit transmission in the pico-cell, beam patterns and the number of streams that are not permitted in the macro-base station M-BS may be notified. For example, since the number of beam patterns that is permitted in the macro-base station M-BS is high in the subframe #1, there is the case that an information amount is smaller in notifying of indexes of beam patterns that are not permitted than in notifying of indexes of permitted all beam patterns. In such a case, indexes of beam patterns that are not permitted in the macro-base station M-BS may be notified. In addition, in the case of switching the signaling method dynamically, it is necessary to notify the pico-base station P-BS of switching of the signaling scheme.

The coordination section 36 performs interference coordination between the macro-cell and the pico-cell and backhaul signaling as described above. The coordination section 36 refers to optimal beam patterns notified from the pico-base station P-BS (1) . . . , and determines a beam pattern and the number of streams that are permitted (or not permitted) in the macro-base station M-BS for each of the subframes #1, #3 and #5 that permit transmission in the pico-cell. The coordination section 36 determines the beam pattern and the number of streams that provide small interference to the pico-cell and that enable macro-throughput to be increased as possible. The coordination section 36 is provided with the codebook table as shown in FIG. 6. The section 36 acquires the index (or the subset number) associated with the determined beam pattern by referring to the codebook table. The section 36 notifies the pico-base station P-BS of the subframe pattern in which the index (or the subset number) associated with the determined beam pattern is set on the corresponding subframe, as a coordination pattern, via the backhaul link L.

The scheduling-beam pattern-calculating section 24 of the pico-base station P-BS (1) detects beam patterns used in the macro-base station M-BS (1) in the subframes #1, #3 and #5 from the coordination pattern. The scheduling-beam pattern-calculating section 24 selects beam patterns that have small interference with the beam patterns used in the macro-base station M-BS (1), and indicates the beam patterns and transmission subframes to the transmission signal generating section 25.

As a result, also in the transmission period assigned to the pico-base station P-BS (1), the macro-base station M-BS is capable of communicating with the macro-UE with interference to the pico-cell suppressed, and it is thereby possible to increase macro-throughput.

In the above-mentioned descriptions, the present invention is specifically described using the above-mentioned Embodiment, but it is obvious to a person skilled in the art that the invention is not limited to the Embodiment described in the Description. For example, in the above-mentioned Embodiment, the number of users and the number of processing sections in the apparatus are not limited thereto, and are capable of being modified as appropriate corresponding to the apparatus configuration. Further, the invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2011-002443 filed on Jan. 7, 2011, entire content of which is expressly incorporated by reference herein.

The invention claimed is:

1. A radio base station apparatus comprising:
a beam generating section configured to generate a directional beam to a user terminal using antenna weights based on a beam pattern assigned to the user terminal existing in a first cell having a first coverage area; and
a coordination section configured to determine a beam pattern so that a beam pattern to the user terminal existing in the first cell is a beam pattern that suppresses interference power to a user terminal existing in a second cell, in assigning the beam pattern to the user terminal existing in the first cell during a transmission period assigned to a micro-base station locally forming the second cell having a second coverage area smaller than the first coverage area in the first cell,
wherein the coordination section receives a second cell beam pattern suitable for the user terminal existing in the second cell that the micro-base station accommodates from the micro-base station, and determines the beam pattern that suppresses interference power to the user terminal existing in the second cell by referring to the second cell beam pattern, during the transmission period assigned to the micro-base station forming the second cell.

2. The radio base station apparatus according to claim 1, wherein the coordination section determines the beam pattern that suppresses interference power to the user terminal existing in the second cell, and signals a beam pattern that is not assigned to the radio base station apparatus to the micro-base station.

3. The radio base station apparatus according to claim 1, wherein the coordination section has a table having a plurality of indexes respectively associated with a plurality of beforehand determined kinds of beam patterns, an index indicating that all beam patterns are permitted, and an index indicating that all beam patterns are prohibited, specifies an index of a beam pattern determined on a subframe-by-subframe basis, where the subframe corresponds to a transmission time interval, according to the table, and signals the specified index to the micro-base station.

4. The radio base station apparatus according to claim 3, wherein the coordination section signals a set of the index concerning the beam pattern and the number of streams to the micro-base station.

5. The radio base station apparatus according to claim 3, wherein when the coordination section determines a plurality of patterns as beam patterns permitted in one subframe, the coordination section signals indexes of the determined plurality of patterns to the micro-base station.

6. The radio base station apparatus according to claim 3, wherein the coordination section signals an index of each beam pattern registered with the table to the micro-base station on a basis of a subset to which a plurality of indexes is grouped.

7. The radio base station apparatus according to claim 1, wherein the coordination section determines beam patterns that suppress interference power to the user terminal existing in the second cell respectively in different frequency regions.

8. A radio communication method comprising:
generating a directional beam to a user terminal using antenna weights based on a beam pattern assigned to the user terminal existing in a first cell having a first coverage area; and
determining a beam pattern so that a beam pattern to the user terminal existing in the first cell is a beam pattern that suppresses interference power to a user terminal existing in a second cell, in assigning the beam pattern to the user terminal existing in the first cell during a transmission period assigned to a micro-base station locally forming the second cell having a second coverage area smaller than the first coverage area in the first cell,
wherein the coordination section receives a second cell beam pattern suitable for the user terminal existing in the second cell that the micro-base station accommodates from the micro-base station, and determines the beam pattern that suppresses interference power to the user terminal existing in the second cell by referring to the second cell beam pattern, during the transmission period assigned to the micro-base station forming the second cell.

* * * * *